United States Patent [19]

Engel et al.

[11] Patent Number: 5,371,690
[45] Date of Patent: Dec. 6, 1994

[54] METHOD AND APPARATUS FOR INSPECTION OF SURFACE MOUNTED DEVICES

[75] Inventors: Antonie J. Engel, Boulton; William M. Silver, Medfield, both of Mass.

[73] Assignee: Cognex Corporation, Natick, Mass.

[21] Appl. No.: 822,632

[22] Filed: Jan. 17, 1992

[51] Int. Cl.⁵ .............................................. G06K 9/58
[52] U.S. Cl. ..................... 364/570; 364/559; 382/8
[58] Field of Search ............... 358/106, 107; 324/158 F; 382/8; 364/474.34, 559, 560, 570, 571.08, 579, 580

[56] References Cited

U.S. PATENT DOCUMENTS

| | | | |
|---|---|---|---|
| 3,936,800 | 2/1976 | Ejiri et al. | 382/18 |
| 3,968,475 | 7/1976 | McMahon | 382/18 |
| 4,115,702 | 9/1978 | Nopper | 382/48 |
| 4,200,861 | 4/1980 | Hubach et al. | 382/34 |
| 4,254,400 | 3/1981 | Yoda et al. | 382/18 |
| 4,441,206 | 4/1984 | Kuniyoshi et al. | 382/8 |
| 4,630,306 | 12/1986 | West et al. | 382/21 |
| 4,736,437 | 4/1988 | Sacks et al. | 382/34 |
| 4,783,828 | 11/1988 | Sadjadi . | |
| 4,876,728 | 10/1989 | Roth | 382/8 X |
| 4,907,169 | 3/1990 | Lovoi | 382/8 X |
| 4,922,543 | 5/1990 | Ahlbom et al. | 382/48 |
| 4,926,492 | 5/1990 | Tanaka et al. | 382/18 |
| 4,955,062 | 9/1990 | Terui | 382/8 |
| 4,959,898 | 10/1990 | Landman et al. | 29/705 |
| 4,972,359 | 11/1990 | Silver et al. | 364/728.05 |
| 5,073,958 | 12/1991 | Imme | 382/22 |
| 5,081,656 | 1/1992 | Baker et al. | 382/8 X |
| 5,091,861 | 2/1992 | Geller et al. | 364/474.34 |
| 5,113,565 | 5/1992 | Cipolla et al. | 382/8 X |
| 5,133,022 | 7/1992 | Weideman | 382/18 |
| 5,134,575 | 7/1992 | Takagi | 364/559 X |

Primary Examiner—Jack B. Harvey
Assistant Examiner—Eric W. Stamber
Attorney, Agent, or Firm—Lahive & Cockfield

[57] ABSTRACT

The invention provides methods and apparatus for inspecting a surface mounted device to estimate its position. The methods and apparatus provide for storing a description of the component to be inspected; devising a plan for inspecting features of the surface mounted device to determine their characteristics arid, from them, to estimate a position of the device itself; generating an image of at least a portion of the component being inspected; and estimating the component's position by inspecting successive features in accord with the plan. A resulting output signal provides that estimate, for example, to placement equipment which can make final adjustments in placement. According to one aspect of the invention, that plan is intended to reduce with inspection of each successive feature any uncertainty in the estimation of the position of the component.

68 Claims, 5 Drawing Sheets

DIRECTION

```
0000: . . . . .
      . . . . .      SLOPE  = 0.00
      . . . . .      WEIGHT = 1.00
      . . . . .
      x x x x x

0010: . . . . .
      . . . . .      SLOPE  = 0.30
      . . . . .      WEIGHT = 0.75
      . . x x x
      x x . . .

0101: . . . . .
      . . . . .      SLOPE  = 0.50
      . . . x x      WEIGHT = 0.89
      . x x . .
      x . . . .

0111: . . . . .
      . . . x x      SLOPE  = 0.80
      . . x . .      WEIGHT = 0.94
      . x . . .
      x . . . .

1000: . . . . .
      . . . . .      SLOPE  = 0.20
      . . . . .      WEIGHT = 0.50
      . . . . x
      x x x x .

1010: . . . . .
      . . . . .      SLOPE  = 0.50
      . . . . x      WEIGHT = 0.89
      . . x x .
      x x . . .

1071: . . . . .
      . . . . .      SLOPE  = 0.10
      . . . . .      WEIGHT = 0.08
      . x . . x
      x . x x .

1110: . . . . .
      . . . . x      SLOPE  = 0.80
      . . . x .      WEIGHT = 0.94
      . . x . .
      x x . . .

1701: . . . . .
      . . . . .      SLOPE  = 0.10
      . . . . .      WEIGHT = 0.08
      . x x . x
      x . . x .
```

DIRECTION

```
0001: . . . . .
      . . . . .      SLOPE  = 0.20
      . . . . .      WEIGHT = 0.50
      . x x x x
      x . . . .

0100: . . . . .
      . . . . .      SLOPE  = 0.30
      . . . . .      WEIGHT = 0.75
      . . . x x
      x x x . .

0110: . . . . .
      . . . . .      SLOPE  = 0.60
      . . . x x      WEIGHT = 0.90
      . . x . .
      x x . . .

0171: . . . . .
      . . . . .      SLOPE  = 0.20
      . . . . .      WEIGHT = 0.33
      . x . x x
      x . x . .

1001: . . . . .
      . . . . .      SLOPE  = 0.40
      . . . . x      WEIGHT = 0.80
      . x x x .
      x . . . .

1011: . . . . .
      . . . . x      SLOPE  = 0.70
      . . x x .      WEIGHT = 0.94
      . x . . .
      x . . . .

1101: . . . . .
      . . . . x      SLOPE  = 0.70
      . . . x .      WEIGHT = 0.94
      . x x . .
      x . . . .

1111: . . . . x
      . . . x .      SLOPE  = -1.00
      . . x . .      WEIGHT = -1.00
      . x . . .
      x . . . .

1710: . . . . .
      . . . . .      SLOPE  = 0.20
      . . . . .      WEIGHT = 0.33
      . . x . x
      x x . x .
```

FIG. 13

METHOD AND APPARATUS FOR INSPECTION OF SURFACE MOUNTED DEVICES

BACKGROUND OF THE INVENTION

This invention relates to automated vision systems and, more particularly, to methods and apparatus for inspection and placement of surface mounted devices (SMD's).

In automated assembly processes, for example, those for assembling electronic circuit boards, it is important to determine the exact position of components prior to their being positioned for final assembly. Thus, for example, an assembly system must know the axial position and angular orientation of an integrated circuit "chip" before placing its leads on the appropriate pads on the printed circuit board.

The design and size of components that must be placed by these circuit board assembly processes can very greatly. The number and relative size of specific features that must be inspected on those components also vary greatly. It is quite common for a feature to be two to three orders of magnitude smaller than the component as a whole.

Of today's commercially significant components, the smallest measure 1.0 mm by 0.5 mm and consist of a single feature, their rectangular shape. The largest, on the other hand, measure over 50 mm in width and include several hundred features, typically, component leads which, themselves, measure less than 0.25 mm in width.

The outlines of electronic circuit components, or so-called surface mounted devices, are generally polygonal with right angle vertices. They generally have opaque non-conductive bodies of plastic or ceramic from which electrical contacts emanate. These electrical contacts may be leads (rectangular metal strips, possibly bent at one or more points) or pads (metallic regions bonded directly to the body).

Upon initial inspection, these leads and pads may appear to be part of the component body itself. For example, leads may extend away from the body and, thereby, contribute to the component's outline, or they may wrap around underneath the body. Moreover, leads and pads may be tinned. This tends to round corners, increase apparent size, and produce specular reflections and oxidation problems in frontlight.

An SMD inspection and placement machine typically has a "library" of several hundred different component designs. At each assembly step, the machine must inspect and place a component with one of those designs. New component types are being designed continuously as electronic devices and packaging evolve. International standards and widely disseminated specifications typically don't exist until well after a new component's introduction. They may never exist for specialized or proprietary components.

Thus far, the art has failed to provide systems capable of rapidly inspecting a wide variety of SMD's nor those which can be readily updated to accommodate new designs. Traditional solutions have required redesigned software and the release of an update whenever support for a new component is demanded by an end user. This can take many months.

It is, accordingly, an object of this invention to provide an improved automated vision system and, more particularly, an improved method and apparatus for surface mounted device inspection.

A further object of the invention is to provide a surface mounted device inspection system capable of automatically identifying the position of surface mounted devices of varied size and shape.

A still further object of the invention is to provide a surface mounted device inspection system that can be readily updated to inspect new component designs.

Another object is to provide a surface mounted device inspection system capable of automatically determining the acceptability of a component being inspected, that is, for example, determining whether a component has specific features such as leads.

Still other objects of the invention are evident in the description which follows.

SUMMARY OF THE INVENTION

The foregoing objects are attained by the invention, which provides in one aspect an apparatus for inspecting a surface mounted device to estimate its position, that is, its placement along an axis and its angular orientation. The apparatus includes an element for storing a description of the component to be inspected.

It also includes a planning element for devising a plan for inspecting features of the surface mounted device to determine their characteristics and, from them, to estimate a position of the device itself. That plan, more specifically, is intended to reduce with inspection of each successive feature any uncertainty in the estimation of the position of the component.

In further accord with this aspect of the invention, the apparatus includes a video input for generating an image of at least a portion of the component being inspected. An inspection element, coupled with that video input, estimates the component position by inspecting successive features in accord with the plan developed by the planning element. An output signal, generated by the inspection element, provides that estimation, for example, to placement equipment which can make final adjustments in placement.

According to another aspect of the invention, the device description—referred to below as the "UDL" description—can be geometric, representing the outline and features of the device as a compilation of rectangular segments. Each such segment is itself identified by its position and its orientation with respect to other segments, as well as by its dimensions.

The UDL description can also describe attributes of edges of the surface mounted device to be inspected. Those edge attributes can include the visual polarities, that is, whether the edges represent a change from light to dark, dark to light, etc. Thus, for example, the UDL can describe an edge at the junction between the main body and a lead as a "positive" change in polarity, e.g., from dark to light.

The UDL can also describe conditions under which the surface mounted device will be inspected. Thus, it can describe expected lighting conditions, e.g., whether the component will be lighted from the front or back; the resolution of the video camera which will generate an image of the component; the type of pickup tool, e.g., the size and shape of the nozzle used to hold the component during inspection; and the type of motion control within which the inspection apparatus operates.

According to still another aspect of the invention, the planning element can provide coarse edge detection planning, generating a plan signal which calls for inspecting more significant edges of the component to determine their respective positions and alignment (and, from them, the overall position of the SMD itself). Those edges can be "conventional," i.e., defined by a single line or an "edge pair," that is, defined by two parallel lines or sets of points. By way of example, one edge of an "edge pair" may be defined by adjacent ends of a set of component leads, while the other edge may be defined by the opposite ends of those leads.

The coarse edge detection planning element can, according to another aspect of the invention, determine an amount by which the uncertainty would be reduced during inspection of each of a plurality of edges of the component. The inspection plan is generated based on a comparison of those amounts. Thus, for example, the plan can call for inspection of edges in a sequence which will most rapidly reduce uncertainty in estimation of the position of the component.

A surface mounted inspection apparatus constructed in accord with the invention can include a pickup nozzle for holding a component being inspected. The coarse edge detection planning element can determine whether that nozzle may protrude from selected edges of the component during inspection. If so, a plan is generated in "tree" form, with each branch representing alternative edge inspection patterns based on the estimated position of the nozzle at the time of inspection.

The planning element can also include an element for inspecting the component image, as a whole, to determine the gross physical characteristics of the image of the component. Those characteristics include, for example, the area of the image, its principle moments, its center of mass, its angular orientation around a major axis, and the size of the "bounding box" required to surround the entirety of the image. For purposes of determining these characteristics, the whole part analysis planning element can generate from the UDL description a synthetic image of the device to be inspected.

According to another aspect of the invention, the whole part analysis planning element can determine what effect a pickup nozzle would have on a determination of an angular orientation of a component that will be inspected.

Referring now to inspection-time (runtime) functions, according to another aspect of the invention, the inspection element can provide a coarse edge detection for inspecting one or more edges of a component in accord with the plan generated by the planning element. This coarse edge detection can include determining an uncertainty in the estimated position of the component under inspection, and for comparing that uncertainty with an expected uncertainty predicted by the planning element. If that comparison is unfavorable, the apparatus can generate an alert signal, for example, requiring operator intervention.

The inspection apparatus as noted above, can include a pickup nozzle for holding a component being inspected. The planning element can generate a plan-tree representing alternative plans for inspection of successive edges of said device, depending on possible locations of the nozzle during inspection. The coarse edge detection element can, at inspection time, determine what coarse edge, if any, the nozzle is likely protruding from and, based on the determination, can select one of the alternate plans depending on the location of that edge.

The inspection element can further include a whole part analysis element that determines, in accord with the plan, a gross physical characteristic of a surface mounted device under inspection. As noted above, those characteristics can include an area of the component image, a principle moment of the component, a center of mass of the component, an orientation of the component with respect to a major axis, and a bounding box required to surround the component.

A surface mounted device inspection apparatus according to the invention can include both coarse edge detection and whole part analysis elements of the type described above. That apparatus can selectively operate those elements based on the plan signal, as well as on the estimated uncertainty in the component's position. Thus, for example, if the uncertainty is too large to permit locating coarse edges, the apparatus can perform whole part analysis to get a better estimate of position.

Such an inspection apparatus can further include an element for inspecting segments, e.g., leads, of a component to identify their respective locations and positions. That inspection can be conducted on a nearest neighbor-by-neighbor basis, alternating between segments on edges of differing orientation. That is, the apparatus can inspect a lead on the top edge of the component, then the nearest one on the side edge, then the next one on the top, and so forth. The apparatus updates its estimation of the position of the device depending on the position of the segments themselves.

The segment detection element can include a point inspection element for identifying the positions of multiple candidate points on a segment being inspected. In the event a candidate point lies within an estimated position of the pickup nozzle, that point can be excluded as a candidate. Where, however, a plurality of candidate points lie within an estimated position of the nozzle, the point inspection element can generate a better estimate of the position of the nozzle. The point inspection element can, then, determine a position of the associated segment based on positions of candidate points lying outside that new estimate.

According to a related aspect of the invention, where a segment under inspection comprises an "edge pair," as described above, the position of the nozzle can be estimated by identifying the widest adjacent points on that edge pair.

An apparatus as described above can further include an element for determining the acceptability of an estimated position an SMD (or feature thereof) under inspection. That element can compare a positional estimate generated by the inspection element with predetermined standards, and can generate a signal representing the result of that comparison. The apparatus can make that determination with respect to the position of the component as a whole, as well as with respect to portions, e.g., leads and pads, thereof.

The invention provides, in still other aspects, methods for inspecting surface mounted devices in the manner of the apparatus described above.

These and other aspects of the invention are evident in the drawings and in the description which follows.

BRIEF DESCRIPTION OF THE DRAWINGS

A more complete understanding of the invention may be attained by reference to the drawings, in which

FIG. 13 depicts a portion of a preferred look-up table used during the contour angle finding operation of a preferred system constructed in accord with the invention.

DETAILED DESCRIPTION OF THE ILLUSTRATED EMBODIMENT

Figure 1:
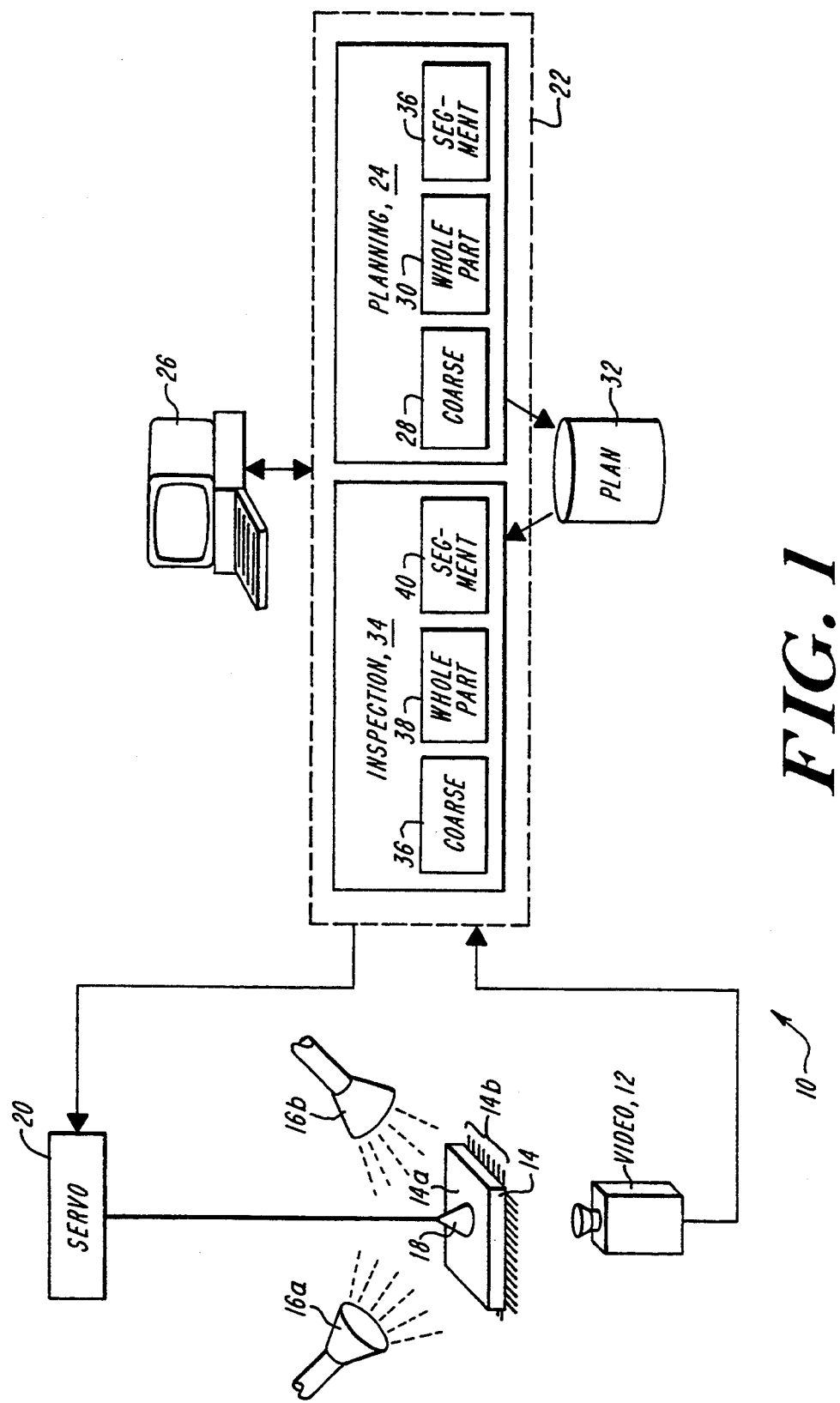
FIG. 1 depicts a preferred system for surface mounted device inspection according to the invention.

FIG. 1 depicts a preferred system 10 for surface mounted device inspection according to the invention. The system 10 includes a video imaging device 12 for generating a signal representing a surface mounted device (or component) 14 under inspection. Dual lighting sources 16a, 16b provide illumination that backlights the component 14. A pickup nozzle 18 holds the component 14 during inspection. Servo 20 moves the nozzle 18 and, thereby, the component 14 for inspection and placement.

Video imaging device 12, lighting sources 16a, 16b, pickup nozzle 18 and servo 20 are operated conventional in the art. Although a backlighting configuration is shown in the illustration, those skilled in the art will appreciate that the system 10 may also be configured to illuminate component 14 via frontlighting techniques.

More particularly, if all of a component's features are visible in its profile, then the system 10 is arranged to inspect it with backlight illumination. Otherwise, it is arranged to illuminate with frontlight. As those skilled in the art will appreciate, backlighting is advantageous because it produces an essentially binary image. Moreover, backlighting is almost completely insensitive to surface properties of the component. An important exception is in the inspection of components with transparent bodies, such as light emitting diodes.

Figure 2:
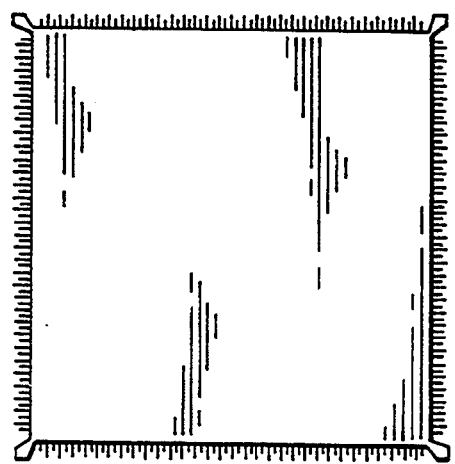
FIG. 2 depicts sample component outlines for inspection by a surface mounted device inspection system constructed in accord with the invention.

Illustrated component 14 represents an exemplary component for inspection by the system 10. The component 14 includes a generally rectangular main body 14a and conductive leads 14b. It will be appreciated that component 14 may be of a variety of configurations and sizes, and need not include component leads. Example component outlines are shown in FIG. 2.

Referring, again, to FIG. 1, the system 10 further includes inspection processor 22 for planning and performing inspection of the component 14. To this end, the processor 22 includes a planning element 24 which generates an inspection plan based on a component description provided, for example, by the operator through console 26. It will be appreciated, of course, that the component description may be supplied to the processor 22 by any conventional means, for example, via a console (as illustrated), a disk file, etc.

In the illustrated system 10, the planning element 24 includes a coarse edge planning section 28, a whole part planning section 30, and a segment planning section 31. These sections 28, 30 are constructed in operated in the manner described below.

An inspection plan signal generated by the planning element 24 is stored in plan file 32 for communication to inspection element 34. The plan signal is composed as discussed below, and may be communicated to the inspection section 34 in any conventional manner, e.g., by way of disk file 32 (as shown), via direct communication from the planning section 24, or otherwise.

The inspection element 34 of processor 22 is also in communication with video imaging means 12, as well as with servo 20, as shown in the illustration. That element 34 includes a coarse edge inspection section 36, a whole part inspection section 38 and a segment inspection section 40 which operate in the manner discussed below.

The inspection element 34 determines the position of the component 14 based on processing the image signal from the video input 12 in accord with the plan. The element 34 can be used, for example, to control the servo for final positioning and placement (e.g., insertion into a printed circuit board) of the component 14 or, alternatively, to alert the operator of missing or gross displacement of the component 14 and any of its subparts (e.g., its leads).

In a preferred embodiment of the invention, processor 22 represents a conventional digital data processing system—and, more preferably, a computing system based on a conventional microprocessor, such as the Motorola 680x0 line of microprocessors, augmented by a vision coprocessor providing vision tool functionality, e.g., projections, as described below and, for example, in U.S. Pat. No. 4,972,359, assigned to the assignee hereof—configured and operated in the manner discussed below.

This is, preferably, carried out under software control as described below. However, those skilled in the art will appreciate that the processor 22 and elements 24, 34 may be implemented on a special purpose device constructed in accord with the teachings herein.

1.0 Overview of Operation

To identify the position of a component 14 under inspection, the processor 22 first identifies its "coarse location." Here, the system locates major features of the component to reduce the initial positional uncertainty resulting from pickup of the component by the nozzle 18 and servo 20. Each significant feature of the component 14 is inspected to determine whether it is present, and to determine whether it deviates from its expected size and position.

If all the necessary features are found and their deviations are sufficiently small, the processor 22 can signal servo 20 to place component 14 for assembly. To do this, the processor 22 determines a translation and rotation which optimizes the alignment of the component's features with a reference target. These features are typically the component's electrically conductive leads, while the reference target is typically an array of pads at the placement site. The optimality criteria is preferably based on percentage coverage of leads by pads.

2.0 Vision Tools

The processor 22 relies principally on three vision tools in determining the position of a component 14. These are "calipers," "blob analysis," and the "contour angle finder." The calipers combine projection, edge detection, and constraints. Blob analysis is a conventional function known in the art for identifying, for example, the area, principle moments and orientation of an object image. The contour angle finder tool determines the rotation angle of a polygonal contour.

2.1 Calipers

The processor 22 uses the caliper tool for feature inspection and coarse edge location. This tool combines image projection at any angle, edge detection within the projected image, and geometric constraints applied to single edges and edge pairs. The constraints include edge polarity, edge position, edge pair spacing and edge pair position.

An important capability of the caliper tool is its ability to correctly identify and determine the position of edge pairs when the edges are interrupted, at an angle with respect to the projection angle, and bracketed by similar but incorrect edges. By applying multiple calipers along the length of an edge (or edge pair) it is possible to determine angle, straightness, and continuity.

To operate the caliper tool it is necessary to specify the edge polarities, constraints to be used, size of window to be searched, expected position, and expected angle. The caliper allows all but the last two parameters to be specified at planning time, i.e., during operation of the planning element 24. This allows the caliper to run extremely quickly at inspection time, i.e., during operation of the inspection element 34, when the expected position and angle become known as a result of coarse location and the inspection of neighboring features.

The caliper tool is also used for coarse location of a component using coarse edges or edge pairs. A coarse edge may be either a continuous edge or it may be interrupted at regular or irregular intervals. The interruptions are called "breaks" and are parameterized by maximum break length. As long as the caliper applied to a coarse edge has a width (projection size) greater than the maximum break length, an edge will be detected at the position of the "coarse" edge.

If the position of an edge within an image is accurately known then a caliper may be placed across it in a manner well known in the art. The caliper can be placed exactly perpendicular to the edge, even at its ends. As the positional uncertainty increases (both angular and translational) it is necessary to stay away from the ends and to lengthen the caliper to avoid "falling off" the edge.

In this case, it is no longer certain that the caliper will be perpendicular to the edge. Because the positional uncertainty model used herein allows calculation of these restrictions exactly, and because the caliper can detect and accurately measure the position of an edge which is not perpendicular to it, the system described herein is able to rely on coarse edges to reduce positional uncertainty and coarse to locate the component.

The use of edge pairs as the primary inspection tool and the formulation of a component description language to accentuate edge pairs as described herein are understood to contribute to the speed and cost effectiveness of the inspection methodology describe herein.

2.2 Blob Analysis

Blob analysis is a standard tool for determining the center of mass, area, and bounding box of a region of connected pixels in an essentially binary image. Though it can often be used to measure angle, it is not preferred herein to use that capability due to the difficulty of predicting when pickup nozzle protrusion might alter the observed angle by a significant amount.

The bounding box is used to reduce translational uncertainty. As described below, the results of blob analysis are combined with those of the contour angle finder, which is used to measure angle.

2.3 Contour Angle Finder

The contour angle finder locates and follows an image contour. As described in greater detail below, at each point along the contour that locally approximates a straight line, the locally indicated orientation (0° to 90°) is accumulated in a histogram. When the complete contour has been traversed, the histogram is searched to determine the overall orientation of the contour. The result is the orientation which produced the strongest signal at some threshold setting. This entire process can be repeated several times using different binarization thresholds until available time has been exhausted. This is particulary useful for small components.

The contour angle finding process begins with a perimeter scan of the component (e.g., the surface mounted device image), involving the following steps:

1a) Classify pixels as "component" or "background," for example, by thresholding;

1b) Determine a point on the component, for example, a point at the center of mass determined by blob (or "whole part") analysis.

2) Find the edge of the component by traversing or "walking" the image in a specified direction (e.g., "east") until a transition between the component and the background is encountered;

3) Move around the perimeter in a manner determined by the state table below, integrating the area to ensure that the outside perimeter (rather than an internal perimeter, e.g., of a hole) is being traversed. To guarantee that the process terminates, this must begin in the northwest (NW) state.

4) Each state in the table causes the process to attempt to move in a specific compass direction. The first argument of each entry in the table indicates how to update the image address to move in that direction; the second is the direction code for table lookups; the third indicates how to integrate area; and the fourth tells what state to enter after successfully moving in the indicated direction. A move is considered successful if the "new" pixel is background.

5) If a state is entered, but the component perimeter blocks movement in that direction, the process attempts to move in the direction indicated by the subsequent entry in the table.

6) The process terminates when it returns to the starting point on the component in the starting state. If, upon termination, the integrated area is negative, the process is assumed to have traversed a void or hole within the component. Or, if upon termination, the area is too small, the process is assumed to have traversed noise. In either case, the process returns to step (2), above, seeking the next edge and traversing it.

7) The process outputs the direction codes representing the motion around the perimeter of the component while it is scanning the perimeter.

```
                         State Table
do
¢ /* NW */ state (−rad − 1, 3, area −= −−y + 1, goto SW)
  /* N  */ state (−rad,    2,           −−y,    continue)
     NE:   state (−rad + 1, 1, area +=  −−y,    continue)
  /* E  */ state (          1, 0, area += −−y,  goto NE)
     SE:   state ( rad + 1, 7, area += ++y,     goto NE)
  /* S  */ state ( rad,    6,           ++y,    goto SE)
     SW:   state ( rad − 1, 5, area −= ++y + 1, goto SE)
  /* W  */ state (         − 1, 4, area −=   y + 1, goto SW)
/
while (p != stop);
```

To find the overall orientation, or angle, of the component, the contour angle finder executes the following steps:

1) Consider all groups of (n) consecutive perimeter points from the perimeter of the object.
2) For each group of points, perform a least-squares best line fit to determine the slope; (n) is preferably five or six. Also, assign a weighting factor, indicating the degree to which those points approximate a straight line, to that slope. Preferably, these functions are carried out with a look-up table.

That table can be constructed by representing any sequence of five points as four compass directions from the first point. But, each compass direction, in turn, can be represented by 3 bits (because there are eight compass directions, i.e., north, northeast, east, etc.). Thus, any sequence of five points can be encoded in twelve bits.

Those twelve bits can be used as a look-up in a 4096-element table containing, in each entry, an eight-bit slope code and an eight-bit weighting code.

3) Normalize the slope by rotating the line in increments of 90° to a range between −45° and +45° degrees so that the slope is between −1 and +1.
4) Create a histogram of the respective slopes of each group of (n) points by adding the weighting factor to the respective "bin" of the histogram.
5) Smoothing on the histogram.
6) Identify the peak of the smoothed histogram, the corresponding bin determines the overall angle of the component contour.
7) Preferably, the contour angle finder also identifies the second highest peak in the histogram. If that height is too close to that of the highest peak, then the heighest peak is determined not to be a good measure of the overall angle of the component.
8) For small components, the above steps can be run at each of several thresholds (where each threshold is a value which determines when an edge of the component is detected). By adding up the histograms determined for each threshold, the contour angle finder more accurately determines the overall angle of the component.

FIG. 13 depicts a portion of a preferred look-up table of the type discussed above used during the contour angle finding operation of a preferred system constructed in accord with the invention. A still better appreciation of a preferred contour angle finding technique is provided in Appendix B (not printed with the patent but is found in the file), filed herewith.

3.0 Pickup Nozzle Training

Figure 3:
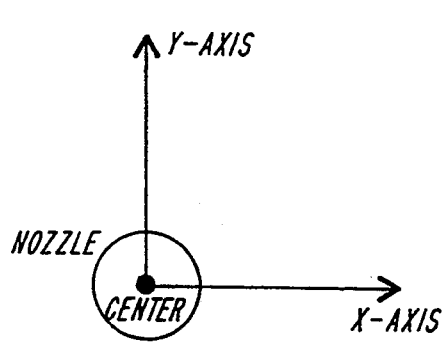
FIG. 3 depicts an XY coordinate system utilized in pickup nozzle training of a system for surface mounted device inspection according to the invention.

The component 14 is typically presented to the camera 12 while held on the tip of a circular nozzle 18 by suction. The center of rotation of the nozzle 18 is the origin of the XY coordinate system. The X axis is parallel to the horizontal direction of the image. The position of the component is measured in XY coordinates, as depicted in FIG. 3.

Because a portion of the nozzle tip may protrude from the outline of the component 14, and because the nozzle tip does not always appear at the same position within the camera's field of view, the processor 22 relies on the planning step, which is performed by the planning element 24, to measure the nozzle size, position, and deviation from the center of rotation. During this step, two images of the nozzle 18 are used, each rotated 180° from the other. The necessary quantities are measured from these two images, which allows the nozzle's effect on coarse location to be anticipated.

4.0 Component Description

As noted above, it is impossible to determine, at the time an SMD placement machine is designed and built, what components it might attempt to place after it is sold. To accommodate a variety of component types, both new or old, the processor 22 and, more particularly, planning element 24 permit the operator to create and enter component designs via console 26. Those designs are specified via a description language referred to herein as the "Universal Description Language" or "UDL." Important components of a UDL component description are: imaging setup, geometric description, positional uncertainty, and placement criteria.

4.1 UDL: Imaging Setup

The imaging description pertains to the conditions under which video 12, lighting sources 16a, 16b, nozzle 18 and servo 20 will conduct the inspection. The conditions include lighting, camera, pickup tool, and motion control. Lighting is either backlight or frontlight. Camera parameters include size of image and pixel to physical units conversion with distortion correction. As noted above, the pickup tool is typically a suction nozzle. Its shape and maximum size are significant if it will not be completely hidden by the components. Motion control indicates where the pickup tool will appear in the image and whether motion can be used to collect multiple images of large components.

4.2 UDL: Geometric Description

The geometric description serves two functions. Firstly, it describes the gross features of the component for purposes of coarse location. Secondly, it describes the expected dimensions and tolerances for critical features, such as component leads, for purposes of the segment inspection.

Figure 4:
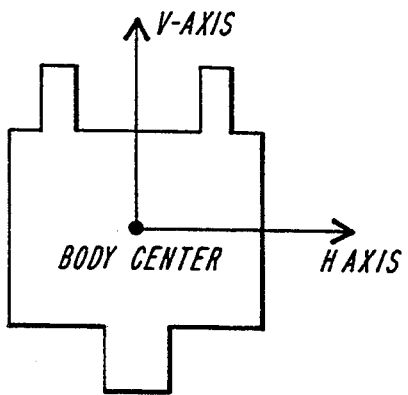
FIG. 4 depicts a sample component in the HV coordinate system utilized by a system for surface mounted device inspection according to the invention.

A component is described in the HV coordinate system whose origin is the body center of the component. FIG. 4 shows a simple component with three leads called an SOT.

Figure 5:
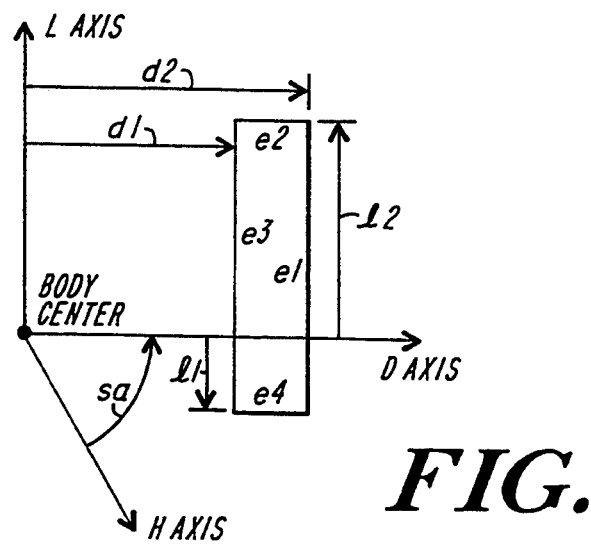
FIG. 5 depicts geometric segment parameters utilized by a system for surface mounted device inspection according to the invention.

The basic geometric building block of the UDL is an oriented rectangle called a segment. The position, orientation, and dimensions of a segment are specified by the parameters sa, d1, d2, l1, l2. The orientation angle sa is measured from the H axis, as shown in FIG. 5, and defines the segment's own DL coordinate system. The expected polarity of the four segment edges (e1,e2,e3,e4) can be specified independently as positive, negative, either, or none.

Additional edges may or may not exist within the area covered by the segment. They must either be described by additional segments or are unimportant to the tasks of coarse location and inspection. Segments are used for both coarse location and feature inspection.

The entire outline of the component is represented by the set of segments. This allows the planning element 24, in its coarse location stages, to estimate what the component will look like and how reliably vision tools will be at measuring position and angle. The SOT shown in FIG. 4 requires four segments: one for the body and one for each lead.

Each segment edge has inspection parameters which indicate the minimum edge length to inspect, how many discrete points to inspect, the minimum spacing between those points, and the expected positional tolerance of the edge.

Two methods are used to deal with component features which are not rectangular. Degenerate segments with either zero width or length are used as line segments to represent beveled corners and sheared off leads. Segments also have corner rounding parameters which indicate that something abnormal happens near the corner. It could mean actual rounding, a bevel, notch, or small protrusion. The inspection process interprets this parameter as an indication of how far to stay away from the corners.

All segment parameters are given in physical units, typically microns. By convention the first segment in a component description is the body with center at 0,0. All other segments are positioned relative to the body center.

Segments with identical size, inspection requirements, and spacing can be grouped together into elements. A segment is also an element with a grouping size of one. The ability to group segments together is particularly convenient for describing rows and arrays of leads or pads. Elements containing a large number of segments are useful for coarse location as well because they explicitly group the small features into a single large entity which is easy to locate using the caliper vision tool due to its regularity.

A segment variant, called a coarse edge, is used for coarse location. Coarse edges can have either a single edge (e1) or edge pair (e1 & e3), unused edges have their polarity set to none. Instead of inspection parameters, a coarse edge has a single parameter called maximum break width. The projection width of a caliper applied to a coarse edge is three times the maximum break width. The effect is to make the break invisible to the caliper. Coarse edges are generated automatically from elements or they may be specified explicitly by the user.

4.3 UDL: Position & Uncertainty

Figure 6:
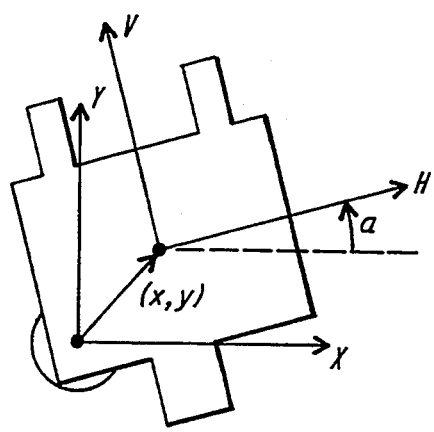
FIG. 6 depicts component positioning in a system for surface mounted device inspection according to the invention.

The position of a component is specified by the three parameters x, y, a. The pair (x,y) determines a vector from the rotation center of the pickup nozzle (the XY origin) to the body center of the component (the HV origin). The rotation angle a determines the orientation of the H axis relative to the X axis, as shown in FIG. 6.

Figure 7:
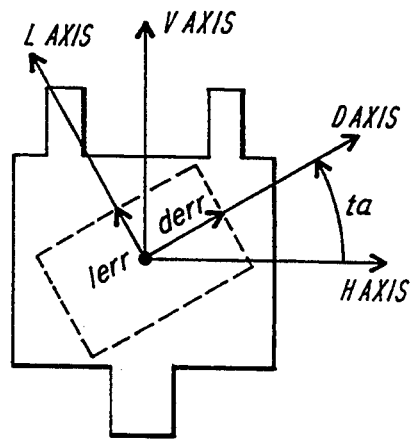
FIG. 7 depicts translational uncertainty in a system for surface mounted device inspection according to the invention.

Uncertainty in the (x,y) parameters, called translational uncertainty, is specified by a possibly rotated rectangle in HV space, as shown in FIG. 7. The size of the rectangle is determined by derr and lerr. The orientation is determined by ta. Uncertainty in a, called rotational uncertainty, is specified by the maximum rotational error, aerr. The following table summarizes the position and uncertainty parameters.

TABLE 1

| Position & Uncertainty Parameters | | |
|---|---|---|
| | Position | Uncertainty |
| Translation | x,y | ta, derr, lerr |
| Rotation | a | aerr |

At all times the parameters x,y,a are an estimate of the real (optimal) position of the component. The uncertainty parameters indicate how good the estimate is. If x',y',a' are the real position then the following conditions hold:

$$a - aerr \leq a' \leq a + aerr \qquad (EQ\ 1)$$

$$\begin{bmatrix} X' \\ Y' \end{bmatrix} = \begin{bmatrix} X \\ Y \end{bmatrix} + \begin{bmatrix} \cos(a + ta) & -\sin(a + ta) \\ \sin(a + ta) & \cos(a + ta) \end{bmatrix} \begin{bmatrix} d \\ l \end{bmatrix} \qquad (EQ\ 2)$$

for some d and l such that:

$$-derr \leq d \leq derr \quad -lerr \leq l \leq lerr \qquad (EQ\ 3)$$

When the position and uncertainty are combined with the geometric description and imaging setup, the regions of an acquired image that may be occupied by each segment and coarse edge can be predicted (See Section 5.2).

The initial value of (x,y) is (0,0). This reflects the pickup goal of trying to center the nozzle on the body. The initial value of a is specified by the user immediately before inspection. The initial values for derr, lerr, and aerr are specified by the user as part of the UDL for the component. The initial value of ta is zero.

4.4 UDL: Placement Criteria

The placement criteria indicates how the translation and rotation placement results for the component are influenced by the inspection results of each feature. Most features have a critical alignment axis. Other features require point to point alignment. Some features may not influence placement at all.

Each segment can influence the placement computation in one of four ways. The segment can have a critical alignment axis parallel to either the H or V axes. It can use point alignment. Or, it can have no influence.

5.0 Planning

The planning step, executed by planning element 24, produces an inspection plan from a UDL description. It permits time consuming computation to be done before high speed operation is required. The first step is to determine how to reduce positional uncertainty. Then the expected positional uncertainty after coarse location, segment inspection criteria, and component geometry are combined to layout segment inspection.

5.1 Planning: Coarse Location

The goal of coarse location, as executed by coarse location element 28, is to reduce the positional uncertainty to a level where segment inspection can begin. The strategy is to iteratively apply vision tools to carefully chosen targets such that the uncertainty is efficiently reduced. Efficiency in this situation is measured in the time taken to remove an amount of uncertainty.

The result of coarse location planning is a sequence of experiments to be performed. Each experiment adds a bit of information which makes the subsequent experiments possible. It will often happen that the experiment to be performed at some step depends on the results of the previous one. In this case the plan needs to provide for each contingency. Rather than a linear sequence, a complete plan may instead be a tree.

The value in performing an experiment is the amount of uncertainty removed. To make comparing the relative values of potential experiments possible, the four uncertainty parameters are combined into a single Error Magnitude value. This value has the desirable properties that it is zero if and only if the goal has been reached, a larger value is always less desirable than a smaller value, and it is easy to compute.

The risk of performing an experiment is that it may fail. When candidate experiments entail varying degrees of risk it is represented by a numerical grade. A higher grade reflects less risk. The most significant risk factor is the expected Error Magnitude. If the resulting Error Magnitude is greater than or equal to the current value then the experiment will always fail to reduce the error, even if it succeeds in locating and accurately measuring its target. Given equal values, the experiment with a higher Grade (less risk) should always be chosen. It may be that some risk components should be overlooked if the result is a smaller Error Magnitude.

The operator can delay specifying the expected rotation angle, a, until runtime. The value of a is restricted to be a multiple of 90° and aerr is restricted to ±45°. This restriction matches the operation of an SMD placement machine where the parts are fed to a pickup point and then prerotated to the expected placement angle before inspection.

5.1.1 Positional Uncertainty Error Magnitude

The positional uncertainty parameters are combined into a single Error Magnitude by Equation 4.

$$errmag = max(0, max(aerr \cdot devrad, derr) - tet) + max(0, max(aerr \cdot devrad, lerr) - tet) \quad (EQ\ 4)$$

The devrad parameter is the maximum distance from the body center to a vertex on any segment with active inspection parameters. It needs to be computed only once at planning time. The tet parameter is the translation error target for coarse location. A value of two pixels is used.

5.1.2 Coarse Location Tree

A coarse location plan is stored in a structure called a coarse location tree. The root node corresponds to the initial positional uncertainty. Each subsequent node corresponds to the application of a specific vision tool using a specified set of parameters which is expected to result in specific residual positional uncertainty. Depth in the tree corresponds to the number of steps taken. A node is a leaf if it has achieved the Error Magnitude goal.

Each node has the following four items:

1. eval function: This function is to be called at runtime if present. It will return a value which may be compared with the values returned by other candidate nodes. The node returning the highest value, or the first node encountered with a null eval function, is the next step to perform.
2. run function: This function actually runs the vision tool. Its effect is to reduce the positional uncertainty.
3. resulting uncertainty: This is the positional uncertainty expected after the vision tool is run. The actual uncertainty should be less than or equal.
4. data: These are the specific parameter values to be used by either the eval or run functions.

The resulting positional uncertainty always reflects the worst case. Factors which may adversely affect the result of a vision tool at runtime, such as nozzle protrusion or component defects, are maximized during planning.

A Coarse Location Tree is built starting at the root. The resulting uncertainty of the root node is set to the initial positional uncertainty. Its run function is set to null. With the root node serving as the initial parent, the procedure to build the tree is as follows:

1. Set the current uncertainty as indicated by the parent node.
2. Evaluate all vision tools against all appropriate targets. The evaluation includes the resulting Error Magnitude and Grade values.
3. Sort the evaluation results and select all acceptable candidates.
4. Link the selected candidates to the parent node.
5. Repeat this procedure for each node linked in step 4 which has a positive Error Magnitude.

Figure 8:
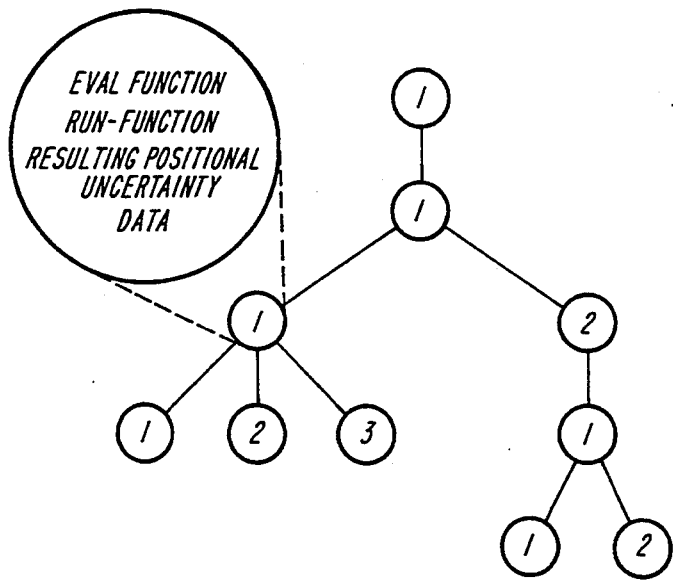
FIG. 8 depicts a coarse location tree generated in a planning stage of a system for surface mounted device inspection according to the invention.

FIG. 8 shows a sample coarse location tree. There is always exactly one node at the first step since nothing has been learned yet. At the second step there are two possibilities to choose from. The decision is made by calling each node's eval function. If node 1 returns the higher value then it leads to three possibilities for the third step. If node 2 returns the higher value then the third step is unambiguous, the eval function isn't called, and it leads to two possibilities at the fourth step. This example illustrates that all leaves are not necessarily at the same depth.

In a preferred embodiment, the coarse location tree is stored in disk file 32 for use by inspection element 34.

5.2 Planning: Blob Analysis & Contour Angle Finder

The blob analysis and contour angle finder tools are executed under control of the whole part section 30. These tools are appropriate vision tools only if the illumination setup indicates an essentially binary image, such as one obtained by backlight illumination or heavily saturated frontlight, and the component can be inspected in a single image. Both tools target the entire component. Both have a runtime proportional to the number of pixels processed. Blob analysis processes all the pixels in the maximum enclosing rectangle given by the current positional uncertainty and the component geometry. The contour angle finder processes only the pixels along the component outline. Both tools can be run on subsampled images to improve speed at the expense of accuracy.

The two tools complement each other's abilities and are used together as a single node in the coarse location tree. At runtime, i.e., during inspection, Blob will measure area, center of mass, and bounding box; Contour Angle Finder will measure rotation angle.

The operation of whole part planning section 30 for Analysis proceeds as follows.

To begin, the UDL contains the information necessary to create a synthetic image of the component at the expected rotation angle. Blob analysis is run on the synthetic image, recording the center of mass and bounding box relative to the body center of the component. The largest possible pickup nozzle (as indicated by the UDL) is then superimposed at the locations indicated by the positional uncertainty as being most likely to affect Blob results. The locations are the four corners and four midpoints of the translation uncertainty rectangle. At each location the deviation of the center of mass and bounding box size is determined.

The Contour Angle Finder is run on the synthetic image to determine the angular offset between the H axis and the strongest signal returned by the contour. A component such as the SOT in FIG. 4 has all its edges parallel to either H or V and would have an offset of 0°. A HEMT component, which resembles the letter 'X', would have an offset of about 45°.

The resulting positional uncertainty is:

$$derr = 4 \text{ pixels} + mnp$$

$$lerr = 4 \text{ pixels} + mnp \quad \text{(EQ 5)}$$

$$ta = 0°$$

$$aerr = 7.5°$$

Where mnp is the maximum center of mass deviation due to nozzle protrusion.

5.3 Planning: Coarse Edges

Coarse Edges are specialized segments which are generally derived from the geometric description of a component. They are the targets of the Caliper vision tool during coarse location. A Coarse Edge (CE) node in the Coarse Location Tree reduces translation uncertainty in one direction and rotation uncertainty if more than one caliper is used.

To accurately target a CE the component's position and uncertainty are combined with the CE's geometry to produce a nearly optimal search region called a CE Rect. An extension of the same computation is used to compute a maximum enclosing rectangle for the component as a whole.

5.3.1 Segment Search Regions

The positional uncertainty model and segment geometry determine where to search for a segment. The maximum enclosing rectangle of the component (mer) is the bounding rectangle of the union of the minimum enclosing rectangles over all segments. Calipers can be applied to the segment if the region is sufficiently restricted. This section describes these regions and how they are computed.

The maximum enclosing rectangle, mer, is important because it is the size of the smallest image window guaranteed to contain the entire component. It is used to determine whether the inspection can be done in a single acquisition (single FOV) or multiple acquisitions (multi FOV), and if so, how many FOVs will be required. It is used by vision tools which target the entire component such as Blob and Contour Angle Finder to restrict their search areas. The mer is the bounding rectangle of the union of the minimum enclosing rectangles over all segments.

Figure 9:
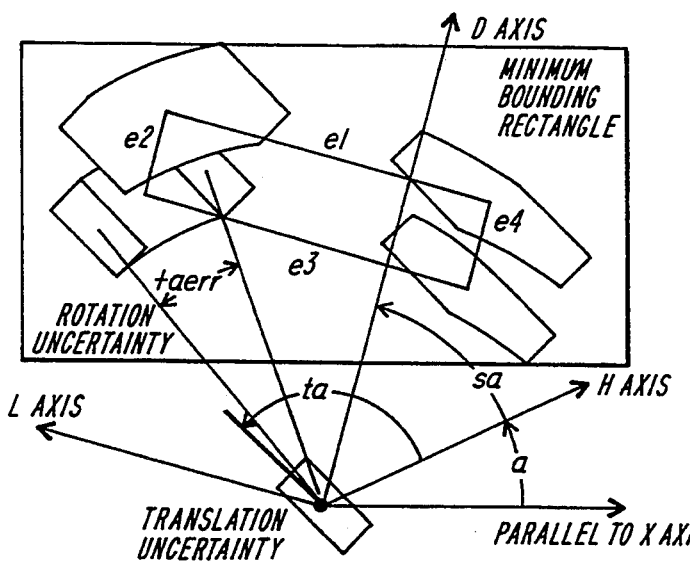
FIG. 9 depicts a segment bounding rectangle utilized in a system for surface mounted device inspection according to the invention.

Each segment (rotated rectangle) may be found in a region of space limited by the positional uncertainty. The minimum enclosing rectangle is the XY aligned bounding rectangle of this region. FIG. 9 shows a segment with edges (e1, e2, e3, e4) oriented to the XY (image) axes. The H axis is shown rotated by position parameter a (expected angle). The DL (segment) axes are rotated by an angle sa from the H axes. The size and position of the segment are given by (d1, d2, l1, l2), see FIG. 5. A translation uncertainty rectangle is shown at the origin of the DL axes which is located at the body center of the component, see FIG. 7. A rotational uncertainty of ±10° is shown acting about the body center.

As shown in FIG. 9, the dark shaded areas show the region within which each segment vertex might actually be located given the uncertainty shown. The lightly shaded region is the minimum bounding rectangle.

Equation 6 shows how the minimum bounding rectangle of a segment is computed. The position of each segment vertex, (vx, vy), is evaluated at 24 points. This is represented by the set S which contains 96 sets of the five parameters p. The third critical angle, ca, is the integral multiple of 90° straddled by a+sa±aerr, if any. Otherwise it is omitted. As shown in FIG. 9, for a component with body center at (0,0), the left, right, bottom, and top of the minimum bounding rectangle in XY coordinates are given by x1, x2, y1, y2, respectively.

$$S = \{\{ca, \pm aerr\} + sa, \{\pm derr\}, \{\pm lerr\}, \{d1,d2\}, \{l1,l2\}\}$$

$$\begin{bmatrix} vx \\ vy \end{bmatrix} = \begin{bmatrix} \cos(ea + a) & -\sin(ea + a) \\ \sin(ea + a) & \cos(ea + a) \end{bmatrix} \begin{bmatrix} sd \\ sl \end{bmatrix} + \quad \text{(EQ 6)}$$

$$\begin{bmatrix} \cos(ta + a) & -\sin(ta + a) \\ \sin(ta + a) & \cos(ta + a) \end{bmatrix} \begin{bmatrix} td \\ ld \end{bmatrix}$$

$$p = \{ea, td, tl, sd, sl\}$$

$$\{x1, x2, y1, y2\} = \{\min_{p \in S} vx, \max_{p \in S} vx, \min_{p \in S} vy, \max_{p \in S} vy\}$$

The caliper vision tool can be used to efficiently reduce positional uncertainty by partially locating several segments. When used in this way a segment is called a coarse edge or CE for short. A CE segment is restricted to using edges e1 & e3 or just e1. In the first case it is called a "CE pair"; in the later a "single CE". The aspect ratio of a CE is restricted to being longer in L than in D.

A caliper can accurately locate a pair of edges only if they entirely traverse the caliper window in the projection direction. To use a Caliper to locate a CE there must be a region in the image where the opposing e1 & e3 edges are guaranteed to cross. This region, if it exists, is called the CE Rect.

Figure 10:
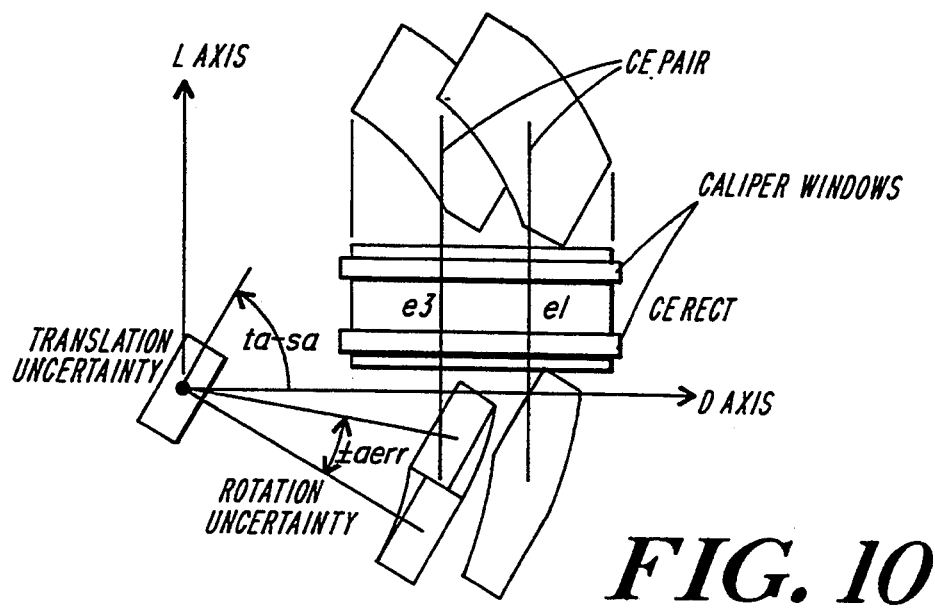
FIG. 10 depicts a coarse edge caliper rectangle utilized in a system for surface mounted device inspection according to the invention.

FIG. 10 shows a CE pair aligned with its DL segment axes. The positional uncertainty shown constrains the CE end-points to lie within the darkly shaded regions. The lightly shaded area is the CE Rect. Two possible caliper windows are shown. Projection would be done vertically; edge detection horizontally. Note that the maximum angle at which the caliper must still be able to detect the edges is aerr.

The horizontal CE Rect dimension is clearly larger than optimal. The cost of processing the extra pixels is small.

Equation 7 shows how the CE Rect of a segment is computed. The position of each segment vertex, (d, l), is evaluated at 24 points. This is represented by the two sets S1 and S2 which contain 48 sets of the five parameters p each. S1 contains all the sets associated with l1 (the bottom two vertices) and S2 does the same for l2 (the top two). The third critical angle is always 0° since aerr is limited to 45°. Since a CE Rect is a rotated rectangle it is parameterized like a segment with cea, d1, d2, l1, l2. Note that the rotation angle of a CE Rect is the same as that of the segment from which it is derived.

$$s1 = \{\{0, \pm aerr\}, \{\pm derr\}, \{\pm lerr\}, \{d1,d2\}, l1\}$$
$$s2 = \{\{0, \pm aerr\}, \{\pm derr\}, \{\pm lerr\}, \{d1,d2\}, l2\}$$

$$\begin{bmatrix} d \\ l \end{bmatrix} = \begin{bmatrix} \cos ea & -\sin ea \\ \sin ea & \cos ea \end{bmatrix} \begin{bmatrix} cd \\ cl \end{bmatrix} + \quad \text{(EQ 7)}$$

$$\begin{bmatrix} \cos(ta - sa) & -\sin(ta - sa) \\ \sin(ta - sa) & \cos(ta - sa) \end{bmatrix} \begin{bmatrix} td \\ tl \end{bmatrix}$$

$p = \{ea, td, tl, cd, cl\}$ $\{cea, d1, d2, l1, l2\} = \{sa, \min d, \max d, \max l, \min l\}$
$p \epsilon S1 \cup S2 \quad p \epsilon S1 \cup S2 \quad p \epsilon S1 \quad p \epsilon S2$
1st min    1st max   2nd    2nd
                                 max    min If the positional uncertainty is too great l1 will be greater than l2 and the CE Rect effectively disappears. Actually, a CE Rect becomes unusable when l2−l1 is less than the projection width required. A CE with a larger aspect ratio, or one which is longer, will remain usable at higher uncertainty levels.

5.3.2 Nozzle Interference

The CE Rect is specified relative to the position of the component. Its position in the image will not be known until runtime. In general this is not a problem since calipers defer the specification of application point and orientation until runtime as well. All the remaining caliper parameters can be assigned specific values when the CE and CE Rect are known. The exception is that the nozzle may appear in the CE Rect area at runtime. The possibility of this happening must be determined at planning time. A contingency plan must be developed if nozzle interference may occur.

Positional uncertainty is reduced as depth increases in the Coarse Location Tree. This reflects a relative rather than absolute improvement in positional knowledge. In other words, the actual position at runtime may still be anywhere within the initial uncertainty envelope, but the residual uncertainty has been reduced.

To determine whether the nozzle will be a problem at an arbitrary level in the tree, a region of space representing the nozzle's possible location relative to the body center is intersected with the CE Rect by the planning section 24. Start with a region which approximates the shape of the largest possible pickup nozzle. Enlarge the region by adding whatever uncertainty has been eliminated up to the current node. Most nozzles are circular and can be approximated by a rectangle. Align this nozzle rectangle to the translational uncertainty rectangle. Convert the original uncertainty by computing the bounding rectangle aligned to the current value of ta which completely encloses the original. Extend the nozzle rectangle by the difference in size in both the derr and lerr directions between the converted initial and current translational uncertainty rectangles.

Figure 11:
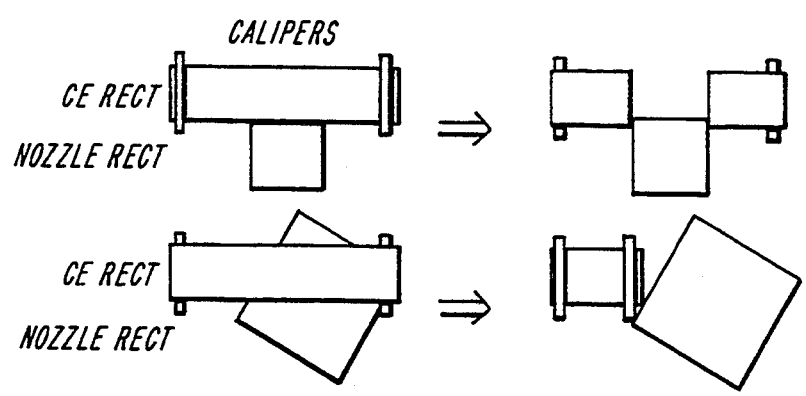
FIG. 11 depicts the impact of nozzle interference on imaging in a system for surface mounted device inspection according to the invention.

When the intersection is non-empty it is often possible to reduce the size of the CE Rect to avoid interference. As will be seen in the next section, the maximum separation between the calipers applied to a CE determines how much uncertainty is eliminated. If the area given up does not affect caliper placement, then it can be ignored (see the first example in FIG. 11). If the effect is that of decreasing the separation then the value of the CE is reduced (second example). In this case there is a choice between accepting the reduced value and hoping that, at runtime, the nozzle does not get in the way. Hope may actually be well founded. It often happens that CE's are available in such a pattern that the nozzle may interfere with one or more, but not all of them. The plan is developed to pursue any of the available CEs. At runtime, the CE with the least likelihood of nozzle interference is chosen.

5.3.3 CE Evaluation

While building the tree, the CEs are repeatedly evaluated to determine which, if any, are appropriate at the current level of uncertainty. The evaluation consists of a value and a grade. The value is the Error Magnitude which is computed based on the expected resulting uncertainty. The grade is a measure of risk. Four risk factors are evaluated and converted into a single numerical grade.

A CE can be inspected by either a single caliper or by multiple calipers. The baseline, bl, is the maximum separation between calipers. Zero if there is only one. The caliper is assumed to have some fixed accuracy, ca. Positional uncertainty is updated as shown in Equation 8 after CE inspection. cea is the CE Rect rotation angle. aerr is updated only if the baseline is positive.

$$ta' = cea$$
$$lerr' = \min\left( \frac{lerr}{\cos(ta' - ta)}, \frac{derr}{\sin(ta' - ta)} \right) \quad \text{(EQ 8)}$$
$$derr' = ca$$

$$aerr' = a\tan\left( \frac{ca}{bl} \right)$$

Once the resulting uncertainty is known the value is computed using the Error Magnitude Equation 4.

The four risk factors are:

1. Reduces Uncertainty. True if the value is less than the current Error Magnitude. Adds 8 to the grade if true.
2. Avoids Nozzle. True if nozzle interference is not possible. True even if the CE Rect area was adjusted to avoid the nozzle. Adds 4 to the grade if true.
3. First Segment. True if the CE is near the first real segment (lead or pad) to be inspected. Adds 2 to the grade if true.
4. Pair. True if the CE is a pair rather than a single. Pairs are preferred because of the size constraint capability of calipers. Adds 1 to the grade if true.

Factors 3 and 4 are considered "details". They are considered only if the other two grade factors are equal and the values are also equal.

When deciding on how to treat nozzle interference it is determined whether the reduced value is still sufficient to trigger the Reduces Uncertainty grade factor. The reduced value is accepted if it is. The original value is used and the Avoids Nozzle grade factor is false if it isn't.

If the highest grade available is greater than 11 then only a single CE node is added as the next step in the tree. Of the CEs with the highest grade, the one with the highest value is used. The detail factors are used to resolve any remaining ties.

If the highest grade is greater than 7 but less than 12 then all the CEs with grades in this range are added to the tree. All of these nodes will reduce the uncertainty but may suffer from nozzle interference.

If the highest value is less than 8 then there are no acceptable CEs and an alternative vision tool must be used.

5.3.4 Automatic CE Generation

Coarse Edges are automatically derived from the Elements specified by the user if they are not specified explicitly. The process of generating CEs is as follows:

1. Repeat step 2 through step 9 for every edge orientation used.
2. Imagine a light source at infinity in the direction perpendicular to the current edge orientation. All edges are considered opaque, regardless of edge polarity. Mark all edges which are directly illuminated and have a definite polarity as candidate CEs. Mark all edges which would have qualified except that they are shaded by other edges closer to the light source as shadow edges. An edge which is shaded along only a portion of its length is split into its non-shaded segments.
3. Merge CE candidate edge segments which lie along the same line if the resulting segment length less three times the maximum included gap is greater than the length of any of the included segments (merged length).
4. Sort merged CE candidates by merged length.
5. Discard all CE candidates which are less than 80% of the greatest merged length.
6. Apply step 3 to the shadow edges.
7. Sort the merged shadow edges by distance from the light source.
8. Attempt to find an edge pair for each remaining CE candidate in the shadow edge list. The merged length of the shadow must be equal to the merged length of the CE candidate and their distance from the light source can differ by no more than one fourth of the merged length.
9. Create CEs from the CE candidates. e1 is the CE candidate edge. e3 is the edge pair, if found. The maximum break width (mbw) is the length of the longest included gap in the CE candidate.

5.4 Segment Inspection

The segments to be inspected are organized by the segment inspection Section 31 into a doubly linked list ordered by a nearest neighbor measure. Except for the trivial cases of one or two segments, each segment has two neighbors. The vector from each neighbor in HV space, called a support vector, is computed and stored with the segment along with pointers to its neighbors. Except for the first segment, a segment is a candidate for inspection when at least one of its neighbors has been inspected.

Calipers are initialized to inspect the required segment edges. Segment tolerances and the expected positional uncertainty after coarse location determine caliper size parameters. If opposing segment edges have identical inspection parameters then they become an edge pair and a single caliper is required. Otherwise, each edge to be inspected has a caliper initialized for it.

The initial positional uncertainty, maximum nozzle size, and segment geometry are analyzed for possible runtime nozzle interference. The boolean result is stored with each segment.

6.0 Inspection

At runtime, i.e., when inspection element 34 performs the inspection operation, commands are received from the placement machine to inspect each component. The commands identify a specific component, pickup nozzle, and expected rotation angle. The expected position is determined from the pickup nozzle training data. The initial positional uncertainty was specified prior to the planning process.

Component inspection follows the sequence:

1. Execution of the Coarse Location Tree
2. Segment Inspection
3. Placement Computation
4. Tolerance Checking 6.1 Execution of the Coarse Location Tree The Coarse Location Tree is executed by the coarse location section 36 and the whole part section 38 as described above, and in accord with the coarse location tree stored, for example, in disk file 32. If only a single node with non-null run function exists at a particular step then its run function is called.

If several nodes with non-null eval and run functions exist then all the eval functions are called. The run function of the node returning the greatest eval value is called.

The resulting positional uncertainty is compared with the value computed during planning to detect errors. Execution proceeds at the step below the node executed.

6.1.1 Blob Analysis & Contour Angle Finder

Blob Analysis is run by the whole part section 38 on the maximum enclosing rectangle. The blob result which contains the rotation center of the nozzle is assumed to be the component. The blob result area is compared to the area computed during planning to determine if the nozzle may have failed to pickup a component.

The contour angle finder is run starting at the center of mass returned by Blob. The resulting angle is offset by the amount indicated during planning. The angle is rotated by multiples of 90° until it lies within the expected uncertainty range. This angle becomes the new value for position parameter a.

The expected position (x,y) is the center of mass plus the center of mass offset vector computed during planning rotated by a.

Positional uncertainty is set to the amount computed at planning time.

6.1.2 Coarse Edges

The eval function returns the smaller of the two distances from the nozzle center of rotation to the two end points of the CE Rect center line mapped to image coordinates by the current expected position.

The run function applies one or two calipers as indicated by planning at positions along the CE Rect's center line calculated at planning time. If only a single caliper is applied then the CE angle is assumed to be the expected angle.

The expected position is updated from the line fit to the caliper results. The (x,y) parameters are translated only along a vector parallel to the CE angle. The expected angle, a, is updated from the CE angle.

Positional uncertainty is set as indicated by Equation 8.

6.2 Segment Inspection

Segment inspection is performed by illustrated section 40. A starting point is selected in the ordered list of segments produced during planning. If possible, the first segment has a neighbor whose critical alignment direction is different from its own.

The second segment is the nearest neighbor to the first which has a different alignment direction. The remaining segments are inspected by alternating between the two ends of the inspected segments in the linked list.

The expected position of a segment is computed from the actual position of a neighboring segment by adding the appropriate support vector transformed by the expected component rotation angle.

The two longer segment edges are inspected first. Opposing edges are inspected as pairs if their inspection parameters are identical. Any edge may be uninspected. Calipers are applied along the edge or edge pair centerline. The number of calipers and spacing is controlled by the edge inspection parameters. A least squares method is used to fit a line to the caliper results for each edge. After each edge (or pair) has been inspected, the results are used to update the expected segment position.

If nozzle protrusion was predicted to be a problem, segment inspection is augmented as follows. Each edge found by the caliper is compared with the predicted nozzle tip position. This region is larger than the actual nozzle tip because of mechanical repeatability problems. If there is an intersection the result is flagged as "in_nozzle". In_nozzle edge points are ignored as long as there are enough points left or there is enough data to disambiguate the nozzle profile from the segment edge. The larger region decreases the probability that invalid points will be used for placement computation while sacrificing some valid data.

Figure 12:
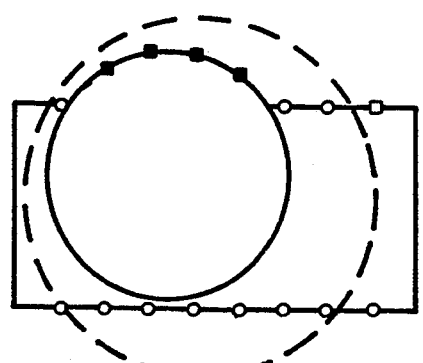
FIG. 12 depicts nozzle protrusion during the inspection stage of a system for surface mounted device inspection according to the invention.

If at least three edge points were flagged in_nozzle, edge pairs were used, three times the point separations is less than the nozzle diameter, and the maximum point separation is greater than the nozzle diameter, then an attempt is made to convert in_nozzle points to valid segment edge points. The widest edge pair is found where at least one edge of the pair was flagged in_nozzle. The neighborhood of three adjacent application points is grown, starting with the widest edge pair, by including the widest adjacent edge pairs. The straightness of the three points on opposite sides of the segment within this neighborhood are compared. The nozzle most likely protrudes from the edge with the less straight points. A nozzle tip circle is fitted to the points from the widest and second widest caliper edge pairs. Each in_nozzle edge point is tested against the new nozzle tip circle. Those which are now outside the circle are recovered and flagged as valid. The updated nozzle tip position is retained for the duration of one segment inspection only. See FIG. 12.

When each edge has been inspected the results are combined to produce an actual inspected segment position, angle, and size.

6.3 Placement Computation

The actual segment positions are fitted to the ideal positions using a least squares method. The error function which is minimized decouples contributions in the H and V directions allowing leads which are typically parallel to either the H or V axis to be aligned along their critical dimension.

A preferred technique for performing the aforementioned functions is provided in Appendix C (not printed with the patent but is found in the file).

6.4 Tolerance Checking

Once a final body center position has been computed the vector from the body center to each segment is evaluated for tolerance errors.

7.0 Managing Memory With Caliper Database

The planning step generates a large number of caliper tools many of which have identical initialization parameters. Rather than complicate the planning process these calipers are merged automatically to conserve storage by the caliper database.

8.0 Preferred Implementation

A further appreciation of the functions and operation of a preferred SMD system 10 constructed in accord with the invention may be attained by reference to Appendix A (not printed with the patent but is found in the file), filed herewith. A preferred C program language implementation of that system is provided in Appendix D (not printed with the patent but is found in the file) filed herewith.

Summary

The foregoing describes an improved vision system and, particularly, an improved method and apparatus for inspection and placement of surface mounted devices. That system meets the aforementioned objectives by permitting the automatic identification of the positions of surface mounted devices of varied size and shape.

It further facilitates inspection of new component designs, by permitting them to be described with the UDL, or Universal Description Language.

It is also capable of automatically determining the acceptability of a component being inspected, that is, for example, determining whether a component has specific features such as leads.

Those skilled in the art will appreciate that the embodiments described above are illustrative only, and that other systems in the spirit of the teachings herein fall within the scope of the invention.

Thus, for example, it will be appreciated that the UDL need not be limited to descriptions based on rectangular segments and, rather, may rely on other geometric shapes.

It will be further appreciated that the division of labor (or functionality) between the planning and inspection elements may differ from that described above.

These and other such modifications, additions and deletions fall within the scope of the invention, of which I claim:

1. An apparatus for inspecting a surface mounted device to estimate a position thereof, said estimation including at least one of an axial placement and an angular orientation estimation, said apparatus comprising:

A. UDL means for storing a UDL signal representative of a shape of at least a portion of a surface mounted device to be inspected, B. planning means, coupled with said UDL means, responsive to at least said UDL signal for generating a plan signal representative of a plan for application of a plurality of successive vision tools to an image signal, each vision tool for inspection of a selected feature of a surface mounted device to determine characteristics thereof and, thereby, to estimate a position of the device itself, wherein said plan reduces with inspection of each successive feature an uncertainty in the estimate of the position of said device, C. video input means for generating an image signal representative of at least a portion of a surface mounted device being inspected, and D. inspection means, coupled with said video input means and in communication with said planning means, for i) applying to said image signal a plurality of successive vision tools, each such vision tool for inspection of a selected feature of said surface mounted device to estimate a position of the device itself in accord with said plan and for generating in connection with application of each such vision tool an output signal representative of said estimate, ii) reducing with application of each such vision tool an uncertainty in said estimate of the position of said device.

2. An apparatus according to claim 1, wherein said UDL means includes means for storing a UDL signal representative of a geometric description of said surface mounted device to be inspected.

3. An apparatus according to claim 2, wherein said UDL means includes means for storing a UDL signal representative of at least an outline of said surface mounted device to be inspected.

4. An apparatus according to claim 2, wherein said UDL means includes means for storing a UDL signal representative of rectangular segments representing features of said surface mounted device to be inspected.

5. An apparatus according to claim 4, wherein said UDL means includes means for storing a UDL signal representative of at least one of a position, orientation and dimension of each said rectangular segment.

6. An apparatus according to claim 2, wherein said UDL means includes means for storing a UDL signal representative of polarities of one or more edges of features of said surface mounted device to be inspected.

7. An apparatus according to claim 1, wherein said UDL means includes means for storing a UDL signal representative of expected conditions under which said surface mounted device is to be inspected.

8. An apparatus according to claim 7, wherein said UDL means includes means for storing a UDL signal representative of at least one of expected lighting conditions, video resolution, pickup tool type and motion control parameters for said inspection.

9. An apparatus according to claim 7, wherein said UDL means includes means for storing a UDL signal representative of an expected position, and uncertainty therein, of the surface mounted device to be inspected.

10. An apparatus according to claim 1, wherein said planning means includes coarse edge detection planning means for generating said plan signal to call for inspection of one or more edges of said device to determine respective positions thereof, said positions including at least one of an axial placement and an angular orientation of the respective edge.

11. An apparatus according to claim 10, wherein
A. at least one said edge of said device comprises a pair of substantially parallel edge points, referred to as an edge-pair, and
B. said coarse edge detection planning means includes means for generating said plan signal to call for inspection of one or more edge-pairs to determine respective positions of the corresponding edges.

12. An apparatus according to claim 10, wherein said coarse edge detection planning means includes means for determining amounts by which said uncertainty would be reduced by inspection of a plurality of selected edges of said device, and generating said plan signal to call for inspection of one or more of those edges based, at least in part, on comparison of those amounts.

13. An apparatus according to claim 12, comprising
A. a pickup nozzle for holding a device being inspected,
B. said coarse edge detection planning means includes means for determining whether said pickup nozzle can protrude from any of said selected edges during inspection thereof, and C. said coarse edge detection planning means includes plan-tree means for responding to such determination for generating a plan signal to represent alternative plans for inspection of successive edges of said device.

14. An apparatus according to claim 1, wherein said planning means includes whole part analysis planning means for generating said plan signal to call for inspection of said device represented by said image signal to determine a gross physical characteristic of said device.

15. An apparatus according to claim 14, wherein said whole part analysis planning means includes means for determining at least one of an area, a principle moment, a center of mass, a bounding box and an orientation of a major axis of said device.

16. An apparatus according to claim 15, comprising
A. a pickup nozzle for holding a device being inspected, and
B. said whole part analysis planning means includes means for determining an effect, if any, that said pickup nozzle would have on a determination of an angular orientation of said device.

17. An apparatus according to claim 14, wherein said whole part analysis planning means includes means for generating from said UDL signal a synthetic image of said device to facilitate said determination of a gross physical characteristic of said device.

18. An apparatus according to claim 1, wherein said planning means includes
A. coarse edge detection planning means for generating said plan signal to call for inspection of one or more edges of said device to determine respective positions thereof, said positions including at least one of an axial placement and an angular orientation of the respective edge,
B. whole part analysis planning means for generating said plan signal to call for inspection of said device represented by said image signal to determine a gross physical characteristic of said device,
C. means for selectively operating at least one of said coarse edge detection planning means and said whole part analysis planning means depending on an amounts by which said uncertainty which would be reduced thereby.

19. An apparatus according to claim 18, wherein said planning means includes segment detection planning means for generating said plan signal to represent a series of segments of said device to be inspected.

20. An apparatus according to claim 1, wherein said inspection means comprises coarse edge detection means responsive to said plan signal for inspecting, in an order determined thereby, one or more edges of said device to determine respective positions thereof, said positions including at least one of an axial placement and an angular orientation of the respective edge.

21. An apparatus according to claim 20, wherein said coarse edge detection means includes uncertainty determination means for
determining from each inspection an uncertainty in the estimated position of said device,
comparing that uncertainty with a prediction thereof represented by said plan signal, and
responding to an unfavorable said comparison for generating an alert signal.

22. An apparatus according to claim 20, wherein said inspection means includes whole part analysis means responsive to said plan signal for determining from said image signal a gross physical characteristic of said device.

23. An apparatus according to claim 22, wherein said whole part analysis means includes means for determining at least one of an area, a principle moment, a center of mass, a bounding box, and an orientation of a major axis of said device.

24. An apparatus according to claim 23, wherein said whole part analysis means includes means for determining from said gross physical characteristic an estimated position of said device and an uncertainty of that estimation.

25. An apparatus according to claim 24, wherein said inspection means includes
   A. coarse edge detection means responsive to said plan signal for inspecting, in an order determined thereby, one or more edges of said device to determine respective positions thereof, said positions including at least one of an axial placement and an angular orientation of the respective edge,
   B. whole part analysis means responsive to said plan signal for determining from said image signal a gross physical characteristic of said device, and
   C. means for selectively operating at least one of said coarse edge detection means and said whole part analysis means in accord with said plan signal.

26. An apparatus according to claim 25, wherein said inspection means includes segment detection means responsive to said plan signal for inspecting segments of said device to identify at least one of the location and position thereof.

27. An apparatus according to claim 26, wherein said segment detection means includes means for inspecting said segments on a nearest neighbor-by-neighbor basis.

28. An apparatus according to claim 27, wherein said segment detection means includes means for updating, as a result of each such inspection of a segment of said device, an estimated position of the device itself.

29. An apparatus according to claim 26, wherein
   A. said video input means is coupled to a pickup nozzle for holding a device being inspected,
   B. said segment detection means includes
      i) point inspection means for identifying positions of a plurality of candidate points on a segment being inspected,
      ii) means coupled with said point inspection means for determining a position of said segment based on positions of one or more of said candidate points,
   C. said segment detection means further includes nozzle disambiguation means for
      i) determining whether a candidate point lies within an estimated position of said nozzle,
      ii) responding to at least a selected determination that a candidate point lies within an estimated position of said nozzle for excluding that point as a candidate.

30. An apparatus according to claim 29, wherein said nozzle disambiguation means includes means selectively responsive to a plurality of said candidate points lying within an estimated position of said nozzle for generating an estimate of a position of said nozzle with reduced uncertainty, and for determining a position of the associated segment based on positions of one or more candidate points lying outside that reduced-uncertainty estimate.

31. An apparatus according to claim 30, wherein a segment being inspected comprises a pair of edges, the improvement wherein said nozzle disambiguation means includes means for estimating a position of said nozzle by identifying widest adjacent points on said pair of edges.

32. An apparatus according to claim 23, wherein said whole part analysis means includes contour angle finder means for determining an orientation of a contour of said surface mounted device, said contour angle finder means including
   A. perimeter scan means for identifying a perimeter of said surface mounted device, and for generating a perimeter signal representative of coordinates of a plurality of points on that perimeter,
   B. segment slope means, coupled with said perimeter scan means, for determining at least a slope of each of a plurality of respective subsets of said perimeter points,
   C. histogram means, coupled with said segment slope means, for generating a histogram of normalized ones of those slopes, and
   D. means for identifying a peak of said histogram to determine an orientation of said surface mounted device.

33. An apparatus according to claim 20, comprising
   A. a pickup nozzle for holding a device being inspected,
   B. said planning means includes plan-tree means for generating a plan signal to represent alternative plans for inspection of successive edges of said device,
   C. said coarse edge detection means includes
      i) nozzle location means for determining what coarse edge, if any, of said device said pickup nozzle may be protruding from,
      ii) means coupled to said nozzle location means for inspecting one or more edges of said device according to selected alternative plan represented by said plan signal.

34. An apparatus according to claim 1, wherein said inspection means includes acceptability means for comparing at least one of an estimated position and size of at least one of
   i) said surface mounted device, and
   ii) a portion of that surface mounted device,
with a predetermined standard, and for generating a signal representative of the result of that comparison.

35. A method for inspecting a surface mounted device to estimate a position thereof, said estimation including at least one of an axial placement and an angular orientation estimation, said method comprising
   A. a shape defining step for defining, with a UDL signal, a shape of at least a portion of a surface mounted device to be inspected,
   B. a planning step for generating, from at least said UDL signal, a plan signal representative of a plan for application of a plurality of successive vision tools to an image signal, each vision tool for inspection of a selected feature of a surface mounted device to determine characteristics thereof and, thereby, to estimate a position of the device itself, wherein said plan reduces with inspection of each successive feature an uncertainty in the estimate of the position of said device,
   C. an image generating step generating an image signal representative of at least a portion of a surface mounted device being inspected,
   D. an inspection step including applying to said image signal a plurality of successive vision tools, each such vision tool for inspection of a selected feature of said surface mounted device to estimate a position of the device itself in accord with said plan and for generating in connection with application of each such vision tool an output signal representative of said estimate, ii) reducing with application of each such vision tool an uncertainty in said estimate of the position of said device.

36. A method according to claim 35, wherein said shape defining step includes the step of storing a UDL signal representative of a geometric description of said surface mounted device to be inspected.

37. A method according to claim 36, wherein said shape defining step includes the step of storing a UDL signal representative of at least an outline of said surface mounted device to be inspected.

38. A method according to claim 36, wherein said shape defining step includes the step of storing a UDL signal representative of rectangular segments representing features of said surface mounted device to be inspected.

39. A method according to claim 38, wherein said shape defining step includes the step of storing a UDL signal representative of at least one of a position, orientation and dimension of each said rectangular segment.

40. A method according to claim 36, wherein said shape defining step includes the step of storing a UDL signal representative of polarities of one or more edges of features of said surface mounted device to be inspected.

41. A method according to claim 35, wherein said shape defining step includes the step of storing a UDL signal representative of expected conditions under which said surface mounted device is to be inspected.

42. A method according to claim 41, wherein said shape defining step includes the step of storing a UDL signal representative of at least one of expected lighting conditions, video resolution, pickup tool type and motion control parameters for said inspection.

43. A method according to claim 41, wherein said shape defining step includes the step of storing a UDL signal representative of an expected position, and uncertainty therein, of the surface mounted device to be inspected.

44. A method according to claim 35, wherein said planning step includes
a coarse edge detection planning step for generating said plan signal to call for inspection of one or more edges of said device to determine respective positions thereof, said positions including at least one of an axial placement and an angular orientation of the respective edge.

45. A method according to claim 44, wherein at least one said edge of said device comprises a pair of substantially parallel edge points, referred to as an edge-pair, the improvement wherein
said coarse edge detection planning step includes the step of generating said plan signal to call for inspection of one or more edge-pairs to determine respective positions of the corresponding edges.

46. A method according to claim 44, wherein said coarse edge detection planning step includes the steps of
A. determining amounts by which said uncertainty would be reduced by inspection of a plurality of selected edges of said device, and
B. generating said plan signal to call for inspection of one or more of those edges based, at least in part, on comparison of those amounts.

47. A method according to claim 44, wherein
A. said coarse edge detection planning step includes the step for determining whether a pickup nozzle holding the device to be inspected can protrude from any of said selected edges during inspection thereof, and
B. said coarse edge detection planning step includes a plan-tree generating step for responding to such determination for generating a plan signal to represent alternative plans for inspection of successive edges of said device.

48. A method according to claim 35, wherein said planning step includes a whole part analysis planning step for generating said plan signal to call for inspection of said device represented by said image signal to determine a gross physical characteristic of said device.

49. A method according to claim 48, wherein said whole part analysis planning step includes a step for determining at least one of an area, a principle moment, a center of mass, a bounding box, and an orientation of a major axis of said device.

50. A method according to claim 49, wherein said whole part analysis planning step includes a step for determining an effect, if any, that a pickup nozzle holding the device to be inspected would have on a determination of an angular orientation of said device.

51. A method according to claim 48, wherein said whole part analysis planning step includes a step for generating from said UDL signal a synthetic image of said device to facilitate said determination of a gross physical characteristic of said device.

52. A method according to claim 35, wherein said planning step includes a step of selectively performing at least one of the following steps depending on an amounts by which said uncertainty which would be reduced thereby:
A. a coarse edge detection planning step for generating said plan signal to call for inspection of one or more edges of said device to determine respective positions thereof, said positions including at least one of an axial placement and an angular orientation of the respective edge, and
B. a whole part analysis planning step for generating said plan signal to call for inspection of said device represented by said image signal to determine a gross physical characteristic of said device.

53. A method according to claim 52, wherein said planning step includes a segment detection planning step for generating said plan signal to represent a series of segments of said device to be inspected.

54. A method according to claim 35, wherein said inspection step comprises a coarse edge detection step responsive to said plan signal for inspecting, in an order determined thereby, one or more edges of said device to determine respective positions thereof, said positions including at least one of an axial placement and an angular orientation of the respective edge.

55. A method according to claim 54, wherein said coarse edge detection step includes an uncertainty determination step for determining from each inspection an uncertainty in the estimated position of said device, comparing that uncertainty with a prediction thereof represented by said plan signal, and responding to an unfavorable said comparison for generating an alert signal.

56. A method according to claim 55, wherein said inspection step includes a whole part analysis step responsive to said plan signal for determining from said image signal a gross physical characteristic of said device.

57. A method according to claim 56, wherein said whole part analysis step includes a step for determining at least one of an area, a principle moment, a center of mass and an orientation, a bounding box, of a major axis of said device.

58. A method according to claim 57, wherein said whole part analysis step includes step for determining from said gross physical characteristic an estimated position of said device and an uncertainty of that estimation.

59. A method according to claim 57, wherein said whole part analysis step includes a contour angle finding step for determining an orientation of a contour of said surface mounted device, said contour angle finding step including a
  A. a perimeter scan step for identifying a perimeter of said surface mounted device, and for generating a perimeter signal representative of coordinates of a plurality of points on that perimeter,
  B. a segment slope step for determining at least a slope of each of a plurality of respective subsets of said perimeter points,
  C. a histogram-generating step for generating a histogram of normalized ones of those slopes, and
  D. a step for identifying a peak of said histogram to determine an orientation of said surface mounted device.

60. A method according to claim 56, comprising
  A. said planning step includes a plan-tree generating step for generating a plan signal to represent alternative plans for inspection of successive edges of said device, and
  B. said coarse edge detection step includes
    i) a nozzle location step for determining what coarse edge, if any, of said device said pickup nozzle may be protruding from,
    ii) inspecting one or more edges of said device according to selected alternative plan represented by said plan signal.

61. A method according to claim 54, wherein said inspection step includes a step for selectively performing at least one of the following steps in accord with said plan signal:
  A. a coarse edge detection step, in an order determined by said plan signal, one or more edges of said device to determine respective positions thereof, said positions including at least one of an axial placement and an angular orientation of the respective edge, and
  B. a whole part analysis step for determining from said image signal a gross physical characteristic of said device.

62. A method according to claim 61, wherein said inspection step includes a segment detection step responsive to said plan signal for inspecting segments of said device to identify at least one of the location and position thereof.

63. A method according to claim 62, wherein said segment detection step includes step for inspecting said segments on a nearest neighbor-by-neighbor basis.

64. A method according to claim 63, wherein said segment detection step includes step for updating, as a result of each such inspection of a segment of said device, an expected position of the device itself.

65. A method according to claim 62, wherein
  A. said segment detection step includes
    i) a point inspection step for identifying positions of a plurality of candidate points on a segment being inspected,
    ii) step coupled for determining a position of said segment based on positions of one or more of said candidate points,
  B. said segment detection step further includes nozzle disambiguation step
    i) determining whether a candidate point lies within an estimated position of a nozzle holding said device under inspection,
    ii) responding to at least a selected determination that a candidate point lies within an estimated position of said nozzle for excluding that point as a candidate.

66. A method according to claim 65, wherein said nozzle disambiguation step includes a step of selectively responding to a plurality of said candidate points lying within an estimated position of said nozzle for generating an estimate of a position of said nozzle with reduced uncertainty, and for determining a position of the associated segment based on positions of one or more candidate points lying outside that reduced-uncertainty estimate.

67. A method according to claim 66, wherein a segment being inspected comprises a pair of edges, the improvement wherein said nozzle disambiguation step includes a step of estimating a position of said nozzle by identifying widest adjacent points on said pair of edges.

68. A method according to claim 35, wherein said inspection step includes a placement acceptability step for comparing at least one of an estimated position and size of at least one of said surface mounted device, or a portion thereof, with a predetermined standard, and for generating a signal representative of the result of that comparison.

* * * * *